United States Patent [19]

Ferguson

[11] 4,226,668
[45] Oct. 7, 1980

[54] SPRAY DRYING APPARATUS UTILIZING PULSE JET ENGINES

[75] Inventor: Frederick A. Ferguson, Yelm, Wash.

[73] Assignee: Sonic Dehydrators, Inc., Weiser, Id.

[21] Appl. No.: 969,398

[22] Filed: Dec. 14, 1978

[51] Int. Cl.² ............................................. B01D 1/14
[52] U.S. Cl. ................................. 159/4 A; 159/4 E; 159/16 R
[58] Field of Search ............... 159/4 A, 4 E, 40, 16 R, 159/16 A, 29

[56] References Cited

U.S. PATENT DOCUMENTS

| | | | |
|---|---|---|---|
| 2,054,441 | 9/1936 | Peebles | 159/4 |
| 2,576,297 | 11/1951 | Horsley et al. | 109/48 |
| 2,887,390 | 5/1959 | Coulter et al. | 159/4 |
| 3,586,515 | 6/1971 | Anderson | 99/209 |
| 3,618,655 | 11/1971 | Lockwood | 159/4 E |

*Primary Examiner*—Norman Yudkoff
*Attorney, Agent, or Firm*—Christensen, O'Connor, Johnson & Kindness

[57] ABSTRACT

Spray drying apparatus is disclosed wherein circumferentially spaced apart exhaust pipes of three L-shaped pulse jet engines extend upwardly into the floor of a cylindrical drying chamber. The engines extend radially outward beneath the floor of the drying chamber, with the engine inlet openings being supported in spaced apart juxtaposition with air augmentation ducts which extend upwardly and tangentially into the drying chamber at equally spaced apart positions near the drying chamber floor. Moisture laden material, such as a slurry tht contains the material to be dried is introduced into the upwardly directed exhaust stream of each engine by means of feedpipes which pass coaxially along the interior of each engine exhaust pipe and an injection nozzle that is affixed to the terminus of each feedpipe at a predetermined distance below the engine exhaust opening. The hot flowing exhaust gases and broad band acoustic energy supplied by the engines atomizes or divides the injected material and causes a substantial reduction in moisture content as the injected material passes to the drying chamber. Moisture removal continues as the material is borne upwardly through and about the drying chamber by the engine exhaust and airflow introduced by the augmentation ducts. The portion of the material reaching the top of the drying chamber is removed through a product outlet opening and the portion falling to the drying chamber floor is swept circumferentially around the chamber floor by the tangentially directed streams of air supplied by the air augmentation ducts. A conventional screw type conveyor that extends across a portion of the chamber floor receives and removes this portion of the material.

12 Claims, 3 Drawing Figures

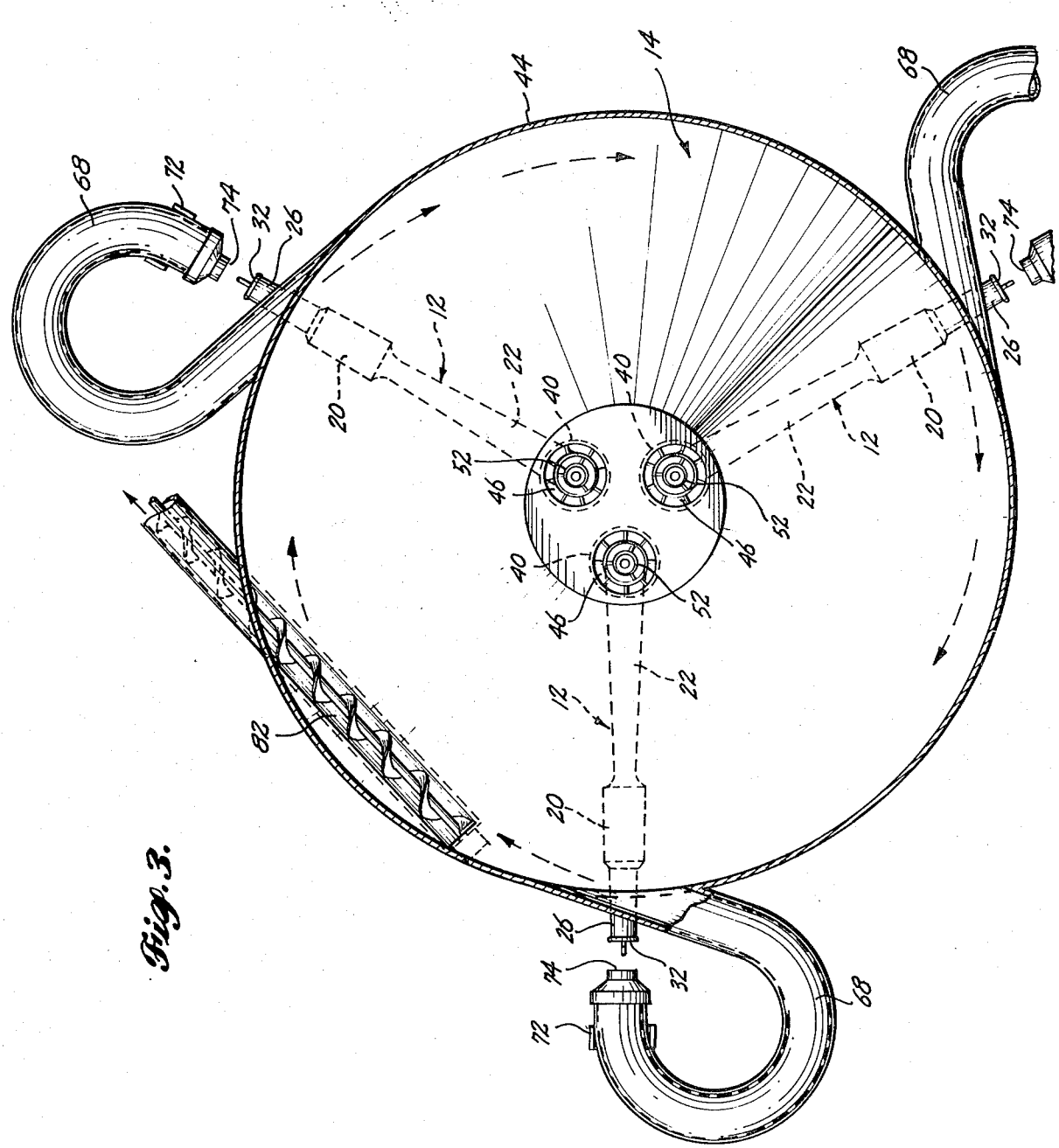

SPRAY DRYING APPARATUS UTILIZING PULSE JET ENGINES

BACKGROUND OF THE INVENTION

This invention relates to spray drying apparatus wherein a substance to be dried is introduced into a heated, flowing, drying medium in the presence of acoustic energy to significantly reduce the moisture content of the substance being processed. More particularly, this invention relates to improvements in spray drying apparatus of the type wherein the substance to be dried is injected into the exhaust stream of a pulse jet engine.

U.S. Pat. No. 3,618,655, issued to Raymond M. Lockwood and assigned to the assignee of the present invention, discloses a spray drying system in which five pulse jet engines are mounted in fluid communication with a cylindrical drying tank to supply the heated, moving gaseous flow and broad band acoustic energy that atomizes and dries a substance being processed. In this arrangement, each pulse jet engine is of a conventional U-shaped geometry wherein the engine exhaust pipe is curved so that the engine exhaust gases are turned through an angle of 180°, i.e., the engine air inlet orifice faces in the same direction as the exhaust orifice. One of the engines, which has come to be known as the "feed" engine, is mounted below the floor of the cylindrical drying tank with the exhaust pipe thereof extending through the tank bottom and the inlet orifice of the engine inlet pipe being mounted in spaced apart juxtaposition with a cylindrical air augmenter that extends upwardly through the tank floor. The substance to be dried is introduced into the exhaust stream of the feed engine by a feedpipe that passes coaxially along the interior of the feed engine exhaust pipe and terminates a short distance from the end of the engine exhaust pipe.

The four additional U-shaped engines of the system disclosed by Lockwood are mounted at equally spaced apart positions around the lower portion of the tank, with the inlet and exhaust pipes thereof passing through the tank wall. More specifically, these four engines are mounted in oppositely disposed pairs with one pair of engines being substantially horizontal to and tangentially intersecting the wall of the tank to induce hot gaseous flow in a circumferential direction. The engines of the second pair are inclined at approximately 30° relative to the horizontal and are mounted to direct gaseous flow inwardly into the tank along paths that form chords which intersect the drying tank axis of symmetry approximately midway between the tank center and sidewall.

Each of the four additional pulse jet engines utilizes cylindrical or ring-like air augmenters that are spaced apart from the engine inlet and exhaust openings so that cooler ambient air is entrained with the hot engine effluent and carried into the tank. Through the use of this secondary airflow, the temperature at the tank floor is maintained at approximately 400° F. Further, the gaseous flow of the four additional pulse jet engines establishes turbulent air currents within the tank which are described in the Lockwood patent as being a series of concentric cyclone-like vortices having alternate upward and downward directions of flow. In order to stabilize these flow vortices about the vertical axis of the tank, the apparatus disclosed by Lockwood includes a centrally mounted horizontal plate at the top of the tank and a truncated cone that extends upwardly from the center portion of the tank floor at a position adjacent to the air augmenter of the feed engine.

In the apparatus disclosed by Lockwood, the interior of the drying tank is maintained at a slightly positive pressure and a slurry or pumpable solution of the material to be dried is injected into the exhaust stream of the feed engine. The slurry is atomized by the hot exhaust stream of the feed engine with the high temperature of the exhaust gas and broad band acoustic energy contained therein removing approximately 15 to 20 percent of the moisture as the injected material passes between the terminus of the feedpipe and the bottom wall of the drying tank. As the material is carried into the drying tank, it is circulated around the interior of the tank by the air currents supplied by the four additional pulse jet engines. Since, in the Lockwood apparatus, the temperature within the tank varies between approximately 400° F. at the bottom of the tank to 200° F. at the top of the tank, the material continues to dry as it is circulated throughout the tank. As the material dries, the lighter particles pass outwardly through an opening in the top of the tank and into a conventional cyclone separator. The heavier particles fall to the bottom of the tank and are removed through openings. In this respect, the Lockwood patent discloses that when fishmeal is being processed, approximately one-third of the fishmeal is carried out through the opening in the upper portion of the tank while the remaining two-thirds settles to the bottom of the tank.

Although the drying system disclosed in the Lockwood patent provides satisfactory operation in many respects, several disadvantages and drawbacks are encountered. First, the use of one or more feed engines in conjunction with the four additional engines that are mounted about the lower periphery of the tank requires a substantial amount of fuel relative to the amount of drying effected. In this respect, the Lockwood patent notes that one such system utilized a 2,000,000 BTU per hour feed engine, with the four additional engines each being rated at 1,000,000 BTU per hour. In this particular system 4,000 pounds of raw fish were processed per hour to yield about 1,000 pounds of fishmeal. Thus, 6,000,000 BTU per hour are required to evaporate approximately 3,000 pounds of water and, considering the enthalpy of water to be 1,170 BTU, the system operates with an overall thermal efficiency of less than 60 percent. Since, as is noted in the Lockwood patent a pulse jet engine is capable of converting fuel to thermal energy with an efficiency of close to 100 percent, it can be seen that a considerable amount of available energy is not utilized in the prior art system of Lockwood. This inefficiency is especially apparent when it is recognized that the high level, broad band acoustic energy generated by the system also effects moisture removal.

Additionally, when the system disclosed by Lockwood is utilized in processing materials other than fishmeal, it has been found that an excessive amount of material often falls to the floor of the tank. In some situations, this material cannot be removed rapidly enough through openings at the bottom of the tank as Lockwood advocates. In fact, it has been found that such material often builds up to the point where operation of the system must be interrupted and the material manually removed.

Even further, controlling the temperature within the drying tank in the manner taught by the Lockwood patent by varying the rate of fuel flow to the pulse jet engines and varying the pressure within the drying tank is not adequate in all situations. In particular, it can be recognized that the temperature within the drying tank is primarily affected by the amount of moisture being removed. Thus, when the injected material has a high volatile liquid content (e.g., on the order of 75 to 95 percent), the temperature within the tank will rapidly decrease with an increase in material injection rate. This means that, unless substantial temperature control can be effected, the capacity of this system is limited to an injection rate that maintains the temperature throughout various portions of the drying tank within acceptable limits. With the temperature control advanced by Lockwood, it has been found that the system often will not provide a desired operating capability without increasing the size (BTU output) of the pulse jet engines and accepting a further decrease in overall system efficiency. Further, the rather limited temperature control provided by this prior art drying system is not always amenable to the drying of materials having a composition and thermal sensitivty that differs significantly from the fishmeal described in the Lockwood reference. In this respect, although a drying system utilizing pulse jet engines would appear advantageous in processing a wide range of materials, such as animal wastes, municipal and industrial sewage sludge and various waste materials that are the normal by-products of food processing operations, to provide useful products such as fertilizers and animal feed while simultaneously eliminating the discharge of ecologically undesirable effluents, the system disclosed in the Lockwood patent cannot be easily adapted to handle such a wide range of materials on a commercial scale.

Accordingly, it is an object of this invention to provide a drying system that utilizes pulse jet engines wherein the system exhibits relatively high thermal efficiency.

It is another object of this invention to provide a highly efficient, high capacity pulse jet drying system wherein the system is easily adapted to drying a wide range of materials.

It is yet another object of this invention to provide a pulse jet drying system wherein the processed material is continuously removed therefrom without requiring an interruption in system operation.

SUMMARY OF THE INVENTION

These and other objects are achieved in accordance with this invention by a drying system wherein a plurality of pulse jet engines supply exhaust gases through associated, circumferentially spaced apart, air augmentation rings that extend upwardly into the central portion of the floor in a cylindrical drying chamber. Each pulse jet engine is substantially "L" shaped in geometry, with the exhaust pipe thereof extending downwardly from the drying chamber floor and then radially outward to its juncture with one end of the engine combustion chamber. A tubular air inlet section, substantially shorter than the engine exhaust pipe, projects axially outward from the opposite end of the engine combustion chamber, with the outer end of each air inlet section being supported in spaced apart juxtaposition with one end of an air augmentation duct.

The air augmentation ducts curve upwardly and enter the drying chamber through spaced apart openings in the lower portion of the drying chamber boundary wall. In particular, each air augmentation duct is configured and arranged to direct a tangential gaseous flow stream into the drying chamber to sweep particulate matter falling to the chamber floor circumferentially around the drying chamber.

In operation, the material to be dried is injected into the exhaust stream of each pulse jet engine by means of feedpipes that extend upwardly into and coaxially along the center region of the vertically extending portion of the pulse jet engine exhaust pipes. Each feedpipe is terminated a predetermined distance below the drying chamber floor so that the injected material, which is atomized as it passes from the feedpipe into the engine exhaust pipe, is substantially dried by the hot exhaust gases and accompanying broad band acoustic energy as the material is carried along the remaining portion of the exhaust pipe. Preferably, an injection nozzle is affixed to the upper end of each feedpipe to eliminate or minimize the build-up of partially dried materials along the upper portion of the exhaust pipe. In this respect, certain types of materials that are otherwise suited for use in the drying system adhere to the exhaust pipe and accumulate to a point at which the affected pulse jet engine ceases to operate. Thus, unless a suitable injection nozzle is utilized when processing such materials, the drying system is not usable or the system must be shut down after a very short interval of operation in order to remove the built-up material which, due to the extremely high temperatures, forms an extremely hard, charred substance.

As the engine exhaust gases cool, ambient air is drawn through the annular openings of the air augmentation rings and mixed with the upwardly directed flow. In this respect, the system is typically constructed so that the engine exhaust gases, which are generally 2,500° to 3,000° F. within the engine combustion chamber, are cooled to approximately 1,200° to 1,300° F. by the air flowing upwardly through the air augmentation rings when no material is being injected into the engine exhaust pipe. Further, the system is generally operated at a material feed rate which decreases the temperature of the flow entering the drying chamber to approximately 150°–250° F. The upwardly directed exhaust gases then mix with the tangentially directed streams of air supplied by the air augmentation ducts (which are also typically at a temperature of 150° to 300° F.) and the material being dried is carried upwardly through and about the interior of the drying chamber. As the material dries, the heaviest particulate matter falls to the floor of the chamber and is swept circumferentially thereabout by the airstreams of the augmentation ducts. As the dried material is swept about the drying chamber floor, it is collected by a screw-type conveyor that is located within one sector of the cylindrical chamber and adjacent to the boundary wall. Since the chamber floor slopes downwardly toward the boundary wall, the material that falls to the chamber floor is continuously collected and conveyed from the drying chamber to suitable storage facilities or suitable packaging equipment. The lighter particles which travel upwardly to the top of the drying chamber are conveyed from the drying chamber through a duct which transports the dried material to conventional cyclone separators. These separators collect the dried material and direct it through a conventional conveying system to the system storage means or packaging equipment. To aid the system in collecting the portion of the dried material that passes to the cyclone separators, the interior region of the drying chamber is preferably maintained slightly below ambient air pressure with a conventional blower unit drawing air from the drying chamber through the ducts which interconnect the drying chamber and cyclone separators. Additionally, if desired or necessary, any small amount of remaining solid material can be removed from the air that is exhausted from the cyclone separators through use of suitable emission control equipment such as a wet scrubber.

To provide control over the temperature within various regions of the drying chamber which supplements the control effected by varying engine fuel flow rates and material feed rates, the drying systems disclosed herein can include various means for controlling the amount of cool ambient air that is drawn into the air augmentation ducts. For example, in the disclosed embodiment of the invention wherein three L-shaped pulse jet engines are employed and hence three augmentation ducts are utilized, the opening of each augmentation duct that faces the inlet opening of the associated pulse jet engine is equipped with a substantially conical end cap that decreases the diameter of the augmentation duct opening. Thus, by utilizing an end cap with an appropriately sized opening, the temperature within the lower regions of the drying chamber can be adjusted to maintain a desired value over a range of engine fuel flow and material feed rate conditions.

Several advantageous results are attained by a system constructed in accordance with this inventon as compared to a system built in accordance with the previously referenced Lockwood patent. First, since a major portion of the necessary drying is achieved within the system of this invention while the material is within the engine exhaust pipes and exposed to substantial thermal and acoustic energy, far greater system efficiency is attained. In particular, through the use of L-shaped engines and the elimination of the four additional engines of the Lockwood system, thermal efficiency ranging between 80 and 95 percent has been attained under various processing conditions, as compared to thermal efficiencies on the order of 60 percent which are achieved with comparable prior art systems. Secondly, it has been found that the use of the above mentioned air augmentation ducts which tangentially direct gases flowing from the air intake sections of the associated pulse jet engines and entrained ambient air across the sloped floor of the drying chamber actually provides operation that is superior to that provided by the four additional pulse jet engines utilized in the Lockwood system. In this respect, the sweeping action that is caused by the tangentially directed airstreams constantly move the particulate matter that falls to the floor of the chamber into the screw-type conveyor system to prevent the accumulation of material within the drying chamber. Hence, particulate matter that falls to the floor of the chamber is not exposed to the high temperature environment for a longer period of time than is necessary and system operation need not be interrupted merely to remove accumulated dried material. Additionally, by installing suitably sized end caps on the inlet openings of the air augmentation tubes, additional temperature control is attained so as to permit processing of a wider range of materials and the use of a wider range of material feed rates that would otherwise be possible.

BRIEF DESCRIPTION OF THE DRAWINGS

Other objects and advantages of the present invention will become apparent to one skilled in the art after reading the following description taken together with the accompanying drawings in which:

FIG. 3 is a cross-sectional view taken along the lines III—III of FIG. 2 to further illustrate the arrangement of the L-shaped pulse jet engines and the associated air augmentation ducts.

DETAILED DESCRIPTION

Figure 1:
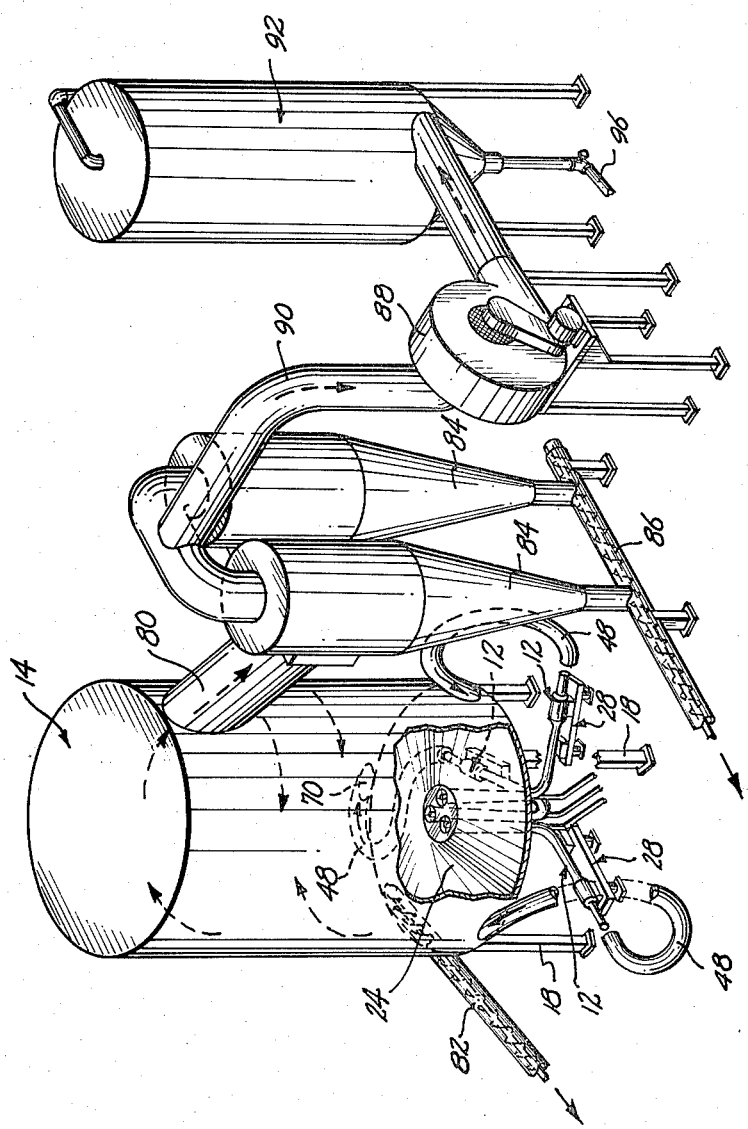
FIG. 1 is an isometric view of a drying system arranged in accordance with this invention.

FIG. 1 schematically depicts a system constructed in accordance with this invention wherein three pulse jet engines 12, of a substantially L-shaped configuration, extend radially outward beneath a cylindrical drying chamber 14 that is supported above a suitable foundation 16 by circumferentially spaced apart, downwardly extending support legs 18. As will be described in more detail hereinafter, the material to be dried, which is in the form of a slurry or solution, is introduced into the hot gaseous exhaust stream of each pulse jet engine and travels upwardly into the drying chamber 14.

Each pulse jet engine 12 includes a substantially tubular combustion chamber 20, an L-shaped exhaust pipe 22 that extends axially between one end of the combustion chamber 20 and the central portion of the floor 24 of the drying chamber 14, and a substantiallytubular inlet section 26 that extends axially outward from the other end of the combustion chamber 20. Further, each pulse jet engine 12 is supported and retained by radially extending engine supports 28 that rest on the foundaton 16.

The pulse jet engines 12 operate in a manner known to the art, in that a combustible mixture of fuel and air is initially supplied to the combustion chamber 20 and ignited by a conventional igniter 30 that projects inwardly into the combustion chamber 20. The resulting rapid expansion of the combustion products causes hot gaseous flow (approximately 2,500° to 3,000° F. within the combustion chamber 20) to be expelled through the entrance opening 32 of the inlet section 26 as well as through the exhaust pipe 22. This rapid expansion and expulsion of gases from pulse jet engine 12 creates a partial vacuum within the combustion chamber 20 to draw fresh air through the inlet section 26 and into the combustion chamber 20, and to introduce an additional charge of fuel, which is supplied to the combustion chamber 20 via fuel nozzles 34 that are connected to a fuel supply line 36. Once operation of such a pulse jet engine has been initiated, the combustion chamber 20 reaches a temperature which ignites the fuel/air mixture without the use of the igniter 30 and the engine continues to cycle or "pulse" at a frequency that is determined by structural parameters of the engine (e.g., the length and diameter of the combuston chamber 20, the exhaust pipe 22 and the inlet section 26). In this respect, it has been found advantageous to preheat each pulse jet engine 12 when the system is placed in operation. For example, in the arrangement of FIG. 2, a compressed air input 38 is positioned adjacent the entrance opening 32 of the engine inlet section 26 and propane is initially supplied to the engine combustion chamber to establish a flame that extends inwardly into the inlet section 26 and combustion chamber 20 during such a preheating period.

Figure 2:
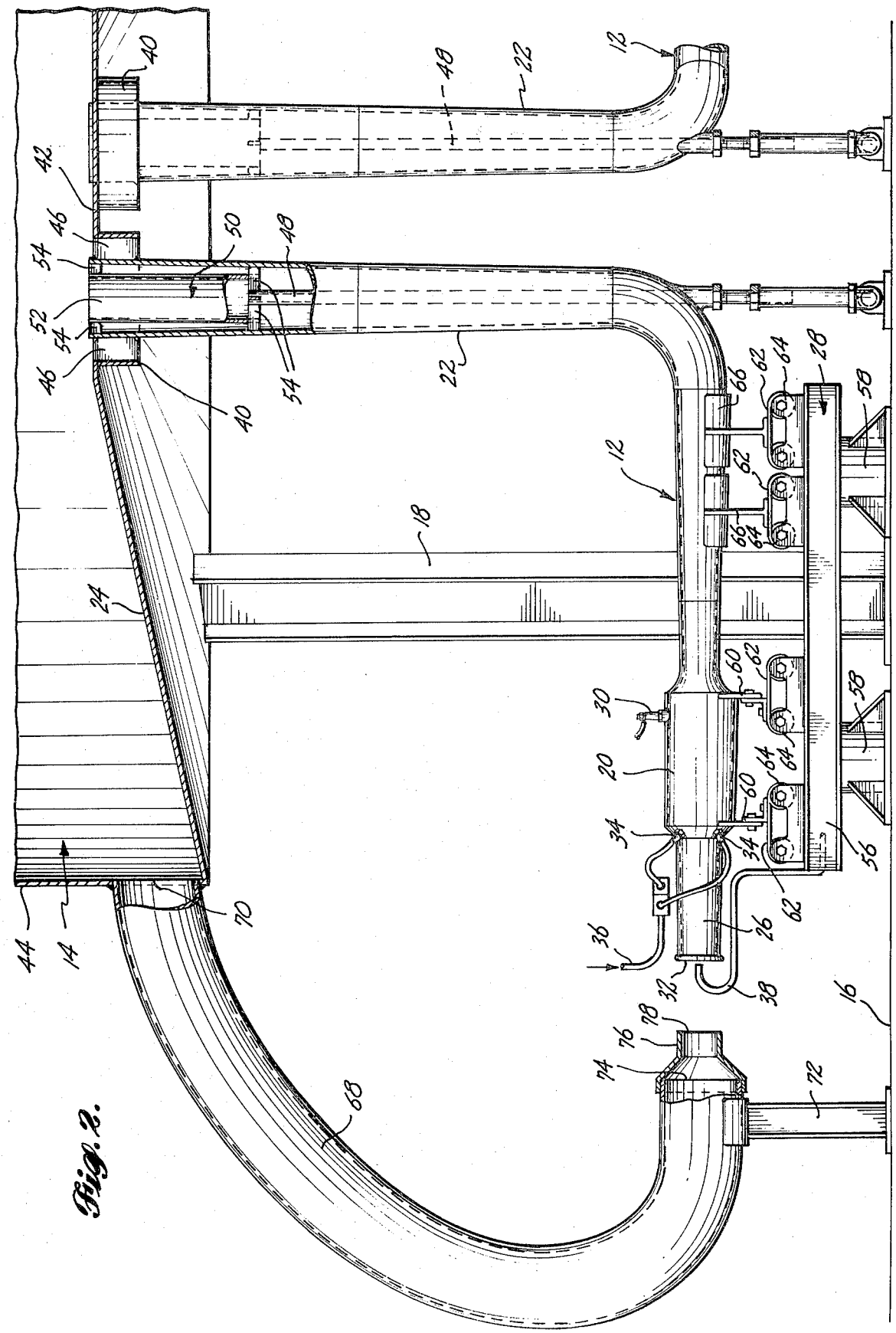
FIG. 2 is a partial elevation view of the drying chamber of the system depicted in FIG. 1 which illustrates the L-shaped pulse jet engines and air augmentation ducts utilized in this invention.

As is best illustrated in FIG. 2, the pulse jet engine exhaust pipe 22 pass through circumferentially spaced apart air augmentation rings 40 that extend downwardly from a central raised portion 42 of the drying chamber floor 24 with the floor 24 sloping downwardly to its juncture with the vertical wall 44 of the drying chamber 14. Preferably, the termination of each exhaust pipe 22 is substantially flush with the upper surface of the central floor region 42 and the upper end of each exhaust pipe 22 is positioned within the associated augmentation ring 40 to form a substantially annular open region 46 between the outer wall of the exhaust pipe 22 and air augmentation ring 40. During operation of this system, the hot gaseous exhaust flow that is ejected through an exhaust pipe 22 and into the drying chamber 14 causes cool ambient air to be drawn through the annular space 46 of the associated air augmentation ring 40. The cool air passing through the air augmentation rings 40 thus mixes with the hot exhaust gases to form a gaseous flow that is reduced in temperature relative to the temperature of the pulse jet engine exhaust effluent. For example, in embodiments of the invention wherein the gases within the engine combustion chamber are typically at a temperature of approximately 3,000° F., the hot exhaust gases mix with cooler ambient air at the exit opening of exhaust pipe 22 so that the temperature along the central floor region 42 is approximately 1,200° to 1,300° F. (when no material is being dried within the system).

With continued reference to FIG. 2, the material to be dried is introduced into the interior of each pulse jet engine exhaust pipe 22 by means of feedpipes 48 that extend into and coaxially along the center portion of each exhaust pipe 22. Pumps (not illustrated) that are interconnected with each feedpipe 48 force the material, which can be in the form of a paste, a slurry or aqueous solution, into and through the feedpipes 48. Since each feedpipe 48 terminates a predetermined distance below the central region 42 of the drying chamber floor 24, the material exiting the feedpipes 48 is exposed to the hot pulse jet engine exhaust effluent and high level acoustic energy produced by the pulse jet engines 12 as the material is swept upwardly and into the drying chamber 14. More specifically, the high velocity turbulent flow within the exhaust pipes 22 causes the material to be atomized immediately upon passing into the exhaust pipe 22 from the feedpipe 48. Since the atomized material is subjected to the high temperature engine effluent and attendant broad band acoustic signals (noise energy) of a level that typically exceeds 150 dB (relative to a reference level of 0.0002 dynes per square centimeter), substantial moisture removal is effected prior to introduction of the material into the drying chamber 14. Depending on the substance being processed, the engine fuel flow rates and material feed rates are generally established so that the temperature of the upwardly directed flow from the engine exhaust pipe 22 and air augmentation ring 40 is approximately 250° to 300° F.

If desired or necessary, the length of the feedpipes 48 and hence the distance over which the material is exposed to the high temperature pulse jet engine exhaust effluent can be varied to control the amount of drying that is achieved within the exhaust pipes 22 and to prevent burning or scorching when temperature sensitive materials are being processed. In this respect, in one embodiment of the invention wherein the feedpipes 48 have an inner diameter of approximately one inch, the engine exhaust pipes 22 taper to a final diameter of 7.25 inches, and the pulse jet engines 12 resonate at a frequency of approximately 125 cycles per second, it has been found that positioning the terminus of each feedpipe 48 approximately 16 to 18 inches below the terminus of the associated exhaust pipe 22 provides satisfactory operation both with respect to moisture removal and overheating of the material being processed.

The previously referenced patent to Lockwood discloses simply terminating the feedpipes 48 or flaring the terminal ends thereof. It has been found, however, that such a configuration does not provide satisfactory operation when certain substances are being processed. More specifically, it has been found that, when such simple termination techniques are utilized, many materials tend to stick to the walls of the exhaust pipe 22 as the materials pass upwardly from the feedpipe 48 and into the drying chamber 14. When this occurs, the hot metal surface causes the material to form a burned, hardened layer that continues to build up as the system operates. In most cases the build-up of such material not only causes smoke and cinders that can affect the quality of the dried material, but directly affects the operation of the drying system 14. In particular, when sufficient material accumulates within the exhaust pipes 22, the resonant operation of the pulse jet engines 12 is affected and, quite often, the engines cease to operate. When this occurs, the entire drying system must be shut down and the accumulated, burned material must be scraped and chipped away. Thus, it is usually advantageous to utilize an injection nozzle that extends upwardly from the upper terminus of each feedpipe 48 in order to eliminate or minimize the build-up of the above-mentioned deposits.

A material injection nozzle 50 which provides satisfactory operation in processing a wide range of substances is depicted in FIG. 2; such injection nozzle 50 forming the subject matter of a patent application by Frederick Ferguson and Rodney Payne that is assigned to the assignee of this invention and was filed of even date with this application. Basically, each injection nozzle 50 includes a cylindrical member 52 that is mounted within the exhaust pipe 22 of each pulse jet engine 12 and extends downwardly from the central region 42 of the drying chamber floor 24 to a point within the exhaust pipe 22 that lies a predetermined distance below the terminus of the feedpipe 48. Each cylindrical member 52 is supported and retained by a plurality of circumferentially spaced apart mounting tabs 54 that extend between the upper terminus of the cylindrical member 52 and the inner wall of the exhaust pipe 22 and by a similar plurality of mounting tabs 54 that are located at the lower end of the cylindrical member 52 to interconnect the outer surface of the feedpipe 48, the cylindrical member 52 and the inner wall of the exhaust pipe 22. As is fully set forth in the above referenced copending patent application which discloses and claims such an injection nozzle, the various dimensions of the cylindrical member 52 (e.g., length, diameter and thickness) as well as the distance that the cylindrical member 52 extends below the terminus of the feedpipe 48 are selected in view of other system dimensions such as the diameter of exhaust pipes 22 to thereby establish fluid flow and acoustic conditions which prevent or greatly reduce the above discussed accumulation of the material being dried as the material passes between the terminus of the feedpipe 48 and the drying chamber 14.

Referring still to FIG. 2, each engine support 28 comprises a horizontal mounting platform 56 that is affixed to vertical supports 58. In this arrangement, a downwardly extending bracket 60 is welded or otherwise attached to each end of the pulse jet engine combustion chamber 20. Each bracket 60 is attached to a spring member 62 that circumferentially encompasses bolts or pins 64 that are retained in the mounting platform 56. Additionally, the horizontal section of the pulse jet engine exhaust pipe 22 rests in two arcuate cradle members 66 that extend downwardly at the aft end of the engine mounting platform 56 and interconnect with additional sets of springs 62.

In accordance with the drying system of this invention, air augmentation ducts 68 that are configured and arranged for receiving hot gaseous flow emitted from the entrance opening 32 of each pulse jet engine inlet section 26 supply additional streams of heated air to the lower region of the drying chamber 14. These additional streams of air cause dried particulate matter that falls to the floor 24 to be swept circumferentially about the drying chamber 14 and also interact with the gaseous flow exiting the exhaust pipes 22 to establish temperature and flow conditions within the drying chamber 14 that provide additional moisture reduction and carry the material being dried upwardly and about the interior of the drying chamber 14. More specifically, the air augmentation ducts 68 extend tangentially outwardly from equally spaced apart openings 70 in the lower region of the drying chamber wall 44, with each opening 70 being adjacent the floor 24. Viewed from the side, the air augmentation ducts 68 first extend downwardly and outwardly and then smoothly curve downwardly and inwardly so that the lower end of each augmentation duct is positioned in spaced apart juxtaposition with the air inlet section entrance opening 32 of an associated pulse jet engine 12. In the arrangement of FIG. 2, the lower end of the augmentation ducts 68 are supported by posts 72 which extend between the foundation 16 and the lower surface of the augmentation ducts 68.

Air augmentation ducts 68 operate in a manner similar to the previously described air augmentation rings 40 in that cool ambient air is entrained with the hot gaseous flow supplied by the pulse jet engines to thereby provide airflow at a temperature which is lower than the temperature of the engine efflux. In this respect, the diameter of the air augmentation entrance opening 74 is generally greater than the diameter of the entrance opening and the associated pulse jet engine air inlet section 26. Since it can be desirable and necessary to control the amount of ambient air that is drawn into the air augmentation ducts 68 and hence control the temperature of the airstreams that are tangentially directed into the drying chamber 14, it can be advantageous to provide means for varying the area of the entrance region of each augmentation duct 68. Such temperature control is achieved in the embodiment of FIG. 2 by end caps 76 that are secured on the lower end of each augmentation duct 68. As can be seen in FIG. 2, the end caps 76 are convergent over approximately one-half of their axial length and then maintain a relatively constant diameter to provide a circular entrance opening 78 that supplies an appropriate mixture of ambient cool air and hot gaseous engine efflux. When such an arrangement is utilized, the temperature within the lower regions of the drying chamber 14, which is primarily controlled by the material feed rate, can be adjusted so that the desitred degree of moisture removal is effected without burning or scorching the dried material.

It should be noted that although the air augmentation ducts 68 depicted in the drawings discharge tangentially directed fluid streams along a substantially horizontal plane, the important thing is that the flow from air augmentation ducts 68 interacts with the drying chamber floor 24 to establish the previously mentioned circumferential sweeping action while simultaneously interacting with the upwardly directed gaseous flow exiting exhaust pipes 22. In this respect, in some embodiments of the invention, it may be desirable to change the angle at which the flow exits air augmentation ducts 68 (both with respect to the horizontal and vertical references).

As previously described, the material being dried passes upwardly into the central region of the drying chamber 14 after having a substantial portion of the moisture removed by the hot gaseous flow and acoustic energy within the exhaust pipes 22 of the pulse jet engines 12. As the gaseous flow of the exhaust pipes 22 passes into the drying chamber 14, it encounters and interacts with the circumferentially directed flow that is produced by the tangentially directed flow streams of the air augmentation ducts 68 when these additional flow streams sweep circumferentially about and upwardly along drying chamber floor 24. Although the exact configuration of the resulting flow pattern within drying chamber 14 is not known, it is known that the material being dried is carried upwardly toward the top of the drying chamber 14 while simultaneously being carried circumferentially around the interior region of the drying chamber. This circulating flow is enhanced not only by the tendency of the hot gases to rise vertically upward, but, as shall be described more specifically, by positive movement of air and dried particulate matter through a product outlet duct 80 that is located in the upper portion of the drying chamber 14 (FIG. 1).

As the gases swirl upwardly within the drying chamber 14, the material being carried therewith continues to dry and, since the gases decrease in temperature and velocity relative to distance above the floor 24 of the drying chamber 14, the coarser particles of the dried material fall downwardly toward the floor 24 while the lighter particles continue upwardly for transport through the product outlet duct 80. That portion of the dried material that falls to the floor 24 is swept circumferentially thereabout by the airstreams provided by the air augmentation ducts 68 and passes into a conventional screw-type conveyor 82 which extends chordwise across one sector of the drying chamber floor 24 (FIGS. 1 and 3). The conveyor 82 removes the falling particles as they begin to accumulate to thereby prevent prolonged exposure of this material to the relatively high temperature environment within the lower region of the drying chamber 14. In this respect, it has been found that the tangentially directed airstreams maintain the floor 24 of the drying chamber 14 in a relatively clean condition throughout fairly extensive periods of operation that exceed a normal work shift to thereby eliminate the need for periodically shutting down the system to remove accumulated product.

As is illustrated in FIG. 1, the air and dried product carried therein that exits the drying chamber 14 through the product outlet duct 80 is routed to one or more conventional cyclone separators 84. As is known in the art, such cyclone separators cause suspended particulate matter to settle and travel downwardly for collection at an output opening of the separator. For example, in the arrangement of FIG. 1, the cyclone separators 84 supply the dried particles to a conventional conveying system 86 which transmits the dried material to packaging equipment or suitable storage bins (not shown in FIG. 1). In the arrangement of FIG. 1, positive air displacement for drawing the dried product through the product outlet duct 80 and into the cyclone separators 84 is supplied by a blower unit 88 which is interconnected with the air exhaust duct 90 of the cyclone separators 84. Typically, the blower unit 88 is of a capacity which maintains the drying chamber 14 at a pressure slightly less than atmospheric and, in the depicted arrangement, exhausts the displaced air into a conventional wet scrubber unit 92. The scrubber unit 92 removes any remaining particulate matter from the exhausted air and discharges liquid effluent containing the particulate matter through a drainpipe 96 for discharge or accumulation.

As previously mentioned, the drying system of FIGS. 1-3 exhibits several advantages over prior art systems such as the system disclosed in the previously referenced patent to Lockwood. In this respect, one primary advantage is a significant increase in system efficiency. For example, the system mentioned in the Lockwood patent includes a 2,000,000 BTU per hour feed engine operating in conjunction with four additional 1,000,000 BTU pulse jet engines that are mounted along the side of the drying tank to convert 4,000 pounds of fish slurry per hour into about 1,000 pounds of fishmeal. Utilizing these figures and considering the enthalpy of water to be 1,170 BTU, it can be seen that the system described by Lockwood operates with a thermal efficiency of less than 60 percent. Such an efficiency is representative of that attainable with such a prior art system and corresponds with reported tests on a 10,000,000 BTU drying system constructed in accordance with the teachings of the Lockwood patent wherein efficiencies ranging between slightly over 50 percent and slightly under 60 percent are attained. In comparison, in a pilot plant operation of the present invention wherein various materials were dried and the three engines have a total output of about 9 million BTU per hour, the thermal efficiency of the system ranges between 80 and 95 percent.

A second advantage of the system of this invention is the provision of far greater temperature control within the various zones of the drying chamber than can be achieved by the prior art systems. In this respect, controlling the area of the inlet opening of the air augmentation ducts 68 and the rate at which air is exited though the product outlet duct 80 (by the blower unit 88) augments temperature control effected by varying the material feed rate or the liquid content of the material being processed. Through use of this additional temperature control, the temperature near the floor of the drying chamber and the temperature in the upper portion of the drying chamber to suit the material being processed. Even further, such temperature control permits desired temperatures to be maintained over a wide range of product feed rates.

Yet another important advantage is achieved in that the tangentially directed airstreams that are provided by the air augmentation ducts 68 not only contribute to the above mentioned increase in system efficiency and, when mixed with the upwardly directed engine exhaust effluent, provide suitable warm air currents within the drying chamber, but, in addition, establish air currents which sweep circumferentially about the floor of the drying chamber. This sweeping action prevents accumulation and overheating of that portion of the dried product which falls to the drying chamber floor by continuously moving the dried particulate matter toward and into a conveyor for removal from the drying chamber.

Those skilled in the art will recognize that the embodiment of the invention depicted and described herein is exemplary in nature and that many variations are possible without exceeding the scope and spirit of this invention. For example, although three pulse jet engines are utilized in the disclosed embodiment, any number of engines can be employed to achieve a desired system capacity as long as the air augmentation ducts supply sufficient airflow to sweep circumferentially around the drying chamber floor and further provide adequate interaction with the upwardly directed exhaust streams to move the material upwardly through the drying chamber. Further, various means for controlling the entrance area of the air augment ducts (other than the disclosed end caps) will be apparent to those skilled in the art and, if desired or necessary, can be applied to the augmentation rings of each pulse jet engine exhaust pipe to provide additional control over the temperature within the drying chamber. Additionally, although the invention is described herein in an orientation in which the pulse jet engine exhaust pipes extend upwardly into a vertical drying chamber, other orientations are possible. For example, a horizontal drying chamber can be used with the pulse jet engine exhaust pipes and air augmentation ducts positioned in one end wall thereof. Thus, it is intended that the claims set forth hereinafter not be deemed restricted to the details of the illustrations as such.

The invention in which an exclusive property or privilege is claimed is defined as follows:

1. Spray drying apparatus comprising:
   a drying chamber having a first boundary surface and a boundary wall extending outwardly from the periphery of said first boundary surface;
   at least one pulse jet engine having an exhaust pipe, an air intake section and a combustion chamber positioned between said exhaust pipe and said air intake section, said exhaust pipe of each of said pulse jet engines extending to said first boundary surface of said drying chamber for exhausting high temperature gaseous flow inwardly into said drying chamber;
   at least one air augmentation duct, each augmentation duct having an entrance opening positioned in spaced apart juxtaposition with the opening in the air intake section of an associated pulse jet engine, each air augmentation duct being configured to enter said drying chamber at a predetermined position in said boundary wall and proximate to said periphery of said first boundary surface, each air augmentation duct being configured and arranged for receiving high temperature gaseous flow emerging from said air inlet section of said associated pulse jet engine and ambient air entrained therewith, each air augmentation duct being further configured and arranged to direct said received gaseous flow and ambient air into said drying chamber to establish substantially circumferential flow along at least the outer regions of said first boundary surface, said circumferential flow established by air augmentation ducts interacting with the upwardly directed gaseous flow supplied by said pulse jet engine exhaust pipes to create inwardly and circumferentially directed flow in the direction away from said first boundary surface of said drying chamber; and supply means for introducing the material to be dried into said exhaust pipe of each of said pulse jet engines, said high temperature gaseous flow within each of said exhaust pipes and attendant high level acoustic energy supplied by said pulse jet engines atomizing said material and effecting substantial moisture removal as said material passes through said exhaust pipe and into said drying chamber, said inwardly and circumferentially directed gaseous flow established by said air augmentation ducts and said inwardly directed flow of pulse jet engine exhaust carrying said atomized material into and about said drying chamber for additional moisture removal.

2. The spray drying apparatus of claim 1 further comprising a plurality of air augmentation rings mounted to extend outwardly from said boundary surface of said drying chamber, each of said air augmentation rings being concentrically positioned about an associated one of said exhaust pipes of said pulse jet engines to define an annular open region about said exhaust pipe to entrain ambient air with the hot gaseous flow exiting said exhaust pipe, said ambient air mixing with said hot gaseous flow to decrease the temperature of said inwardly directed gaseous flow supplied by said exhaust pipes.

3. The spray drying apparatus of claims 1 or 2 wherein said boundary wall of drying chamber is substantially cylindrical and each of said air augmentation ducts enter said cylindrical boundary wall of said cylindrical drying chamber along a path that it substantially tangential thereto.

4. The spray drying apparatus of claim 3 wherein said first boundary surface of said drying chamber is a floor having a central portion at an elevation above that of the lower periphery of said cylindrical boundary wall of said drying chamber and wherein said spray drying system includes two or more pulse jet engines, said exhaust pipes of said pulse jet engines entering said drying chamber floor at circumferentially spaced apart positions within said central region of said floor, said floor sloping downwardly from said central region to the juncture between said floor and said cylindrical boundary wall.

5. The spray drying apparatus of claim 4 wherein the portion of each of said air augmentation ducts that is proximate said cylindrical boundary wall of said drying chamber is substantially horizontal.

6. The spray drying apparatus of claim 5 further comprising conveying means for removing dried material from the floor region of said drying chamber, said conveying means being positioned along said drying chamber floor for receiving dried material that is circumferentially swept around said floor by said circumferentially directed gaseous flow established by said air augmentation ducts.

7. The spray drying apparatus of claim 1 wherein said entrance opening of each of said air augmentation ducts is of greater area than said inlet opening in said air intake section of its associated pulse jet engine, and said spray drying apparatus further comprises end caps mountable over said entrance openings of said air augmentation ducts, each of said end caps being convergent in geometry to define an entrance opening smaller than the entrance openings of said air augmentation ducts.

8. An improved drying system of the type employing a plurality of pulse jet engines each having an exhaust pipe and air inlet section extending outwardly from the oppositely disposed ends of a combustion chamber wherein the material to be dried is injected into the exhaust pipe of one more of said pulse jet engines and borne upwardly through openings in the floor of a drying chamber by the pulsating gaseous exhaust stream of each pulse jet engine that receives said material to be dried, said improved drying system characterized in that the material to be dried is injected into said exhaust pipe of every pulse jet engine utilized in said drying system with said exhaust pipe of each said pulse jet engines being angularly disposed relative to the air inlet section thereof, each of said pulse jet engines being mounted and arranged with said air inlet section extending radially outward beneath the floor region of said drying chamber; said improved drying system further comprising a plurality of air augmentation ducts in one-to-one correspondence with said plurality of pulse jet engines, each of said air augmentation ducts having an entrance opening radially spaced apart from the inlet opening in the air inlet section of the corresponding pulse jet engine, each of said air augmentation ducts being contoured and arranged for directing a portion of the combustion products effluxed through said air inlet opening of said corresponding pulse jet engine and ambient air entrained therewith outwardly and upwardly for discharge into said drying chamber at spaced apart positions along said floor, each of said air augmentation ducts being further contoured and arranged to discharge said portion of said combustion products and said entrained ambient air along a path that is substantially tangential to the boundary wall of said drying chamber.

9. The improved drying system of claim 8 further characterized in that said drying chamber floor includes a raised central region with said floor sloping downwardly between the boundary of said raised central portion and the juncture of said floor with the boundary wall of said drying chamber; said openings in said floor for passage of said pulsating gaseous exhaust streams of said pulse jet engines and said material borne therein being circumferentially spaced apart in said raised central region of said floor.

10. The improved drying system of claim 9 further comprising conveyor means disposed chordwise across one sector of said drying chamber floor along said boundary wall of said drying chamber and extending outwardly from said drying chamber, said conveyor means for receiving dried material that is delivered thereto by circumferentially circulating flow established by said air augmentation ducts.

11. The improved drying system of claim 9 or 10 further comprising a plurality of substantially cylindrical air augmentation rings, each of said air augmentation rings extending downwardly from said drying chamber floor and coaxially surrounding an associated exhaust pipe of one of said pulse jet engines to define an annular open region between said exhaust pipe and said air augmentation ring for entrainment of ambient air.

12. The improved drying system of claim 11 further comprising end cap means affixable to said entrance openings of said air augmentation ducts for controlling the amount of ambient air entrained with said portion of said combustion products effluxed through said air inlet opening of said corresponding pulse jet engine.

* * * * *